Patented Aug. 21, 1945

UNITED STATES PATENT OFFICE 2,383,264

AZO DYESTUFFS FROM 5-AMINO COUMARAN

Hans Z. Lecher, Plainfield, and Robert Prescott Parker and Robert Sidney Long, Somerville, N. J., assignors to American Cyanamid Company, New York, N. Y., a corporation of Maine No Drawing. Application December 10, 1943, Serial No. 513,740

6 Claims. (Cl. 260—152)

This invention relates to a new series of azo dyestuffs derived from 5-amino coumarans, the latter being represented by the following formula:

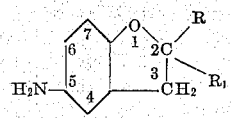

in which R and R₁ are members of the group consisting of hydrogen and akyl radicals. Typical 5-aminocoumarans such as those with which the invention is concerned include for example 5-amino coumaran, 5-amino-2 methyl coumaran, 5 - amino - 2,2 - dimethyl coumaran, 5 - amino - 2 ethyl - coumaran, 5 - amino - 2 - butyl coumaran, 5 - amino - 2,2 - diethyl coumaran, 5 - amino - 2-methyl-2-ethyl coumaran and the like.

More specifically the dyestuffs being obtained by diazotization and coupling of N-substituted derivatives of the amino coumaran in which the N-substituent is a para-aminophenyl-radical. The latter may be represented and numbered for purposes of the present invention as

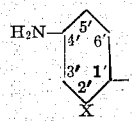

in which X may represent a hydrogen, halogen, nitro, carboxy or sulfonic radical, the acyl radical of a carboxylic acid, or a sulfonamide group.

The instant application relates to the new azo dyestuffs, particularly ice-colors, having novel color shades and unusual light fastness. The N-para-aminophenyl-substituted amino coumarans per se comprise the subject matter of our copending application for United States Letters Patent, Serial No. 513,739, filed of even date.

In general, the principal objects of the present invention are accomplished by condensing the 5-amino coumarans with a para-nitrohalogenobenzene and subsequently reducing the nitro group to an amino group. The resulting new compounds, after diazotization and coupling, yield dyestuffs which have the desired properties.

Either para-nitrohalogenobenzene or a para-nitro-halogenobenzene containing a negative substituent ortho to the halogen radical may be used as a starting material. These negative substituents may include radicals such as halogen, nitro, carboxy, or sulfonic radicals, the acyl radical of a carboxylic acid or a sulfonamide group. In any case, after condensation and reduction the product constitutes an N-para-aminophenyl-substituted 5-amino coumaran. Therefore, as used in the instant application, the expression "a para-aminophenyl radical" includes not only the para-aminophenyl radical, but also those 2'-substituted-4'-aminophenyl groups in which the negative substituents are present.

Similarly, for the purposes of the present invention, the expression "a sulfonamide radical" is used to designate not only the

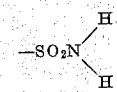

group, but also substituted-sulfonamides. In the latter case, the sulfonamide group may be one in which either or both of the hydrogens are substituted by an alkyl or aryl radical or one in which the substituents form with the nitrogen a heterocyclic ring such as a sulfonpiperidide, sulfonmorpholide or the like.

Those para-nitrohalogenobenzenes containing negative substituents, ortho to the halogen radical, are particularly useful. When such materials are used, condensation proceeds smoothly in aqueous media. The invention, however, is not necessarily so limited. Condensation may be carried out in any solvent compatible with the solubility and reactivity of the particular nitrohalogenobenzene employed. In some cases, an anhydrous solvent such as nitrobenzene or the like is required. In some cases, also, the use of a cupriferous catalyst may be of advantage. Generally, too, it is well to provide an acid binder such as a metal oxide, carbonate or the like.

Reduction of the nitro to an amino group may be carried out either by alkaline or by acidic reducing agents. The pH will determine whether free bases or salts will be produced. It will be apparent that two different types of salts are possible. There may be acid salts of the base. On the other hand, when an acidic substituent such as a carboxylic or sulfonic group is present on the p-aminophenyl radical, the acidic constituent may be neutralized to form a salt. Both types of salts as well as the free bases are useful. Each may be converted to the others by appropriate treatment. Reference to the new bases in the instant specification and claims is therefore intended to include not only the bases themselves but also both types of salts thereof.

Diazotization of some bases of the present invention in mineral acid solution by nitrous acid produces, according to the conditions imposed, two different products. In general, use of higher temperatures, greater concentration of the base in solution, higher mineral acid concentration and excess nitrous acid generally lead to formation of an N-nitroso derivative of the diazonium salts. Lower temperature, lower acid concentrations and controlled nitrous acid addition lead to formation of the diazonium chloride itself.

In general, the N-nitroso diazotization products lead to the production of different, duller and less desirable shades when coupled. The simple diazotized product leads to the production of the more valuable and faster shades. Conversion of the N-nitroso colors to more desirable shades is accomplished through hydrolysis of the former. This may be accomplished by heating the N-nitroso derivatives in dilute solutions of some alkaline material such as soda ash or the like. Reducing agents such as sodium sulfide, sodium bisulfite or their equivalents may be included in the saponification bath to destroy nitric oxides as they are liberated.

In their diazotized form, the bases may be coupled either with or without a substrate, to yield dyestuffs or pigments of great value because of their strength, variety of shade and fastness properties. In particular, however, the bases of the present invention are important for the production of fast blue prints or dyeings upon cellulosic materials. These are produced in general, by impregnating the cellulosic material in alkaline baths with appropriate ice-color coupling components and then printing solutions of the diazotized bases which have been buffered and thickened upon such prepared cloth, or by pad dyeing the prepared cloth in buffered solutions of the diazotized bases or the diazo salts.

The bases of the present invention may be also converted into diazo-sulfonates. If the basic portion of these diazo-sulfonates is free from solubilizing groups, they may be blended with appropriate ice-color coupling components and oxidizing agents. Such blends may be incorporated into a printing paste, printed on vegetable fibers and the pigment developed by treatment with steam.

Substantially any of the ice-color coupling components are generally useful for production of insoluble, developed dyes, and enable the production of a variety of colors from yellow to blue. However, for the present purposes, the use of arylides of 2-hydroxy-3-naphthoic acid is preferable. These produce, when coupled with the diazotized bases of the present invention, the most desirable blue to violet shades.

However, the invention is not necessarily so limited. Among other ice-color coupling components which produce useful products may be listed by way of example such compounds as beta-naphthol, 8-amino-2-naphthol, 8-acetylamino-2-naphthol, benzoyl naphthols; pyrazolones and pyrazyl pyrazolones, hydroxy benzofluorenones; hydroxy derivatives of phenyl naphthylamines such as 7-hydroxy-1-naphthyl-m-hydroxyphenylamine; particularly the various N-substituted amides such as arylides of 5,6,7,8-tetrahydro-2-hydroxy-3-naphthoic acid, of 2-hydroxy-3-anthroic acid, of methyl and dimethyl salicyclic acids, of hydroxy carbazole carboxylic acids, of hydroxy benzocarbazole carboxylic acids, of hydroxy-benzoacridone carboxylic acids, of 3,7-di-hydroxy-naphthalene-2,6-dicarboxylic acid, of hydroxy-dibenzofuran carboxylic acids, of hydroxy benzothiophene carboxylic acids, etc., and the arylides of acetoacetic acid, furoyl acetic acid, benzoyl acetic acid, terphthaloyl-bis-acetic acid and the like. The arylide group in the coupling component may be a simple aromatic group such as the radical of aniline or of an aniline derivative or of a naphthylamine, or it may be the radical of a heterocyclic amine, such as, e. g., of an amine of the benzothiazole series or of a diamine of the diphenylene oxide or diphenylene sulfone series.

The bases of the present invention also may be used in the preparation of water-soluble dyestuffs suitable for dyeing vegetable or animal fibers. In this case, a great many of the customary phenolic or aminic coupling components may be used. The coupling component, however, must carry at least one sulfonic group in case the diazo component has none. Illustrative examples of such coupling components include salicyclic acid, resorcinol, m-phenylene diamine, the large number of naphthol-sulfonic acids such as e. g., R acid, G acid, the Cleve's acids, J acid, gamma acid, J-acid urea and J-acid imide, H acid and many others. Pyrazolones such as sulfonic derivatives of 1-phenyl-3-methyl pyrazolone-5 also may be used.

If so desired, the new diazo components of the present invention also may be used for the production of dis- and poly-azo dyes in accordance with the customary procedures. Depending upon their structure, the dyes obtained from the new bases are direct dyes, acid wool dyes or chrome dyes. In each group, a great many of them have very valuable dyeing and fastness properties.

The invention will be more fully illustrated in conjunction with the following examples which are meant to be illustrative only and not by way of limitation. All parts are by weight unless otherwise noted.

EXAMPLE 1

N-(2'-sulfo-4'-aminophenyl)-5-amino-2-methyl coumaran

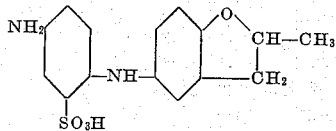

13.5 parts of the hydrochloride salt of 2-methyl-5-amino coumaran are condensed with 26 parts of the sodium salt of 2-chloro-5-nitrobenzene sulfonic acid (89.8%) in 150 parts of water containing 25 parts of calcium carbonate for 24 hours at reflux temperature. 150 parts of water, 3 parts of ammonium chloride are then added to the reaction mixture and at reflux temperature, 19.6 parts of zinc dust are added in small portions. On completion of reduction, the reaction mixture is filtered. Addition of an excess of hydrochloric acid to the clear filtrate throws down a gray precipitate which is filtered, pressed in a filter press and dried at 60° C.

EXAMPLE 2

N-(4'-aminophenyl)-5-amino-2-methyl coumaran

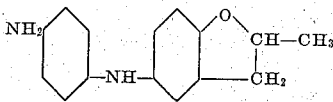

23.8 parts of this N-(2'-sulfo-4'-aminophenyl)-5-amino-2-methyl coumaran are heated in 225 parts of 25% hydrochloric acid under reflux. After 6 hours, 85 parts of 25% hydrochloric acid are added and refluxing is continued for 15 hours at the end of which time complete solution is obtained. The reaction mixture is clarified and the filtrate is evaporated almost to dryness at which point the brown precipitated material is separated by filtration. Crystallized from water, a brownish crystalline product results. The free base may be liberated from a water solution of this product by neutralization with caustic. The N-(4'-aminophenyl)-5-amino-2-methyl coumaran melts at 125° C. with decomposition.

EXAMPLE 3

1 part of the amine as obtained in Example 2 is stirred into 100 parts of water containing 1.25 parts of hydrochloric acid (1.19) and is diazotized to a permanent test against starch iodide paste by the addition of sodium nitrite. 25 parts of the diazo solution are treated with 0.25 part of sodium acetate, 0.5 part of a 50% acetic acid solution, 4.25 parts of water and 70 parts of suitable carbohydrate thickener. This color paste is printed on cotton cloth previously impregnated with the anilide of 2-hydroxy-3-naphthoic acid in alkaline solution. The print is dried, rinsed in a ½% soda ash solution at 140° F., and then soaped at the boil in a 0.1% soap solution which contains 5% of soda ash. The pattern shows a strong blue of reddish shade.

EXAMPLE 4

*2,2-dimethyl-5-amino coumaran*

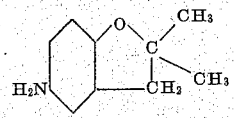

19.8 parts of para-hydroxy-azo benzene and 11 parts of iso-butenyl chloride are heated in 79 parts of acetone in the presence of 14.4 parts of potassium carbonate and 8.3 parts of potassium iodide. After 16 hours' reflux, 400 parts of water are added, and, after cooling, the orange precipitate is filtered off. Crystallized from alcohol, the iso-butenyl-(para-phenyl azo phenyl) ether melts at 65°–67° C. 5 parts of the ether as obtained above are heated in 45 parts of kerosene for 5 hours at reflux. The reaction mixture is diluted with ether and is extracted several times with dilute caustic solution. The alkaline extracts are clarified and acidified with hydrochloric acid. On cooling and stirring, the product separates and is isolated by filtration. Recrystallized from dilute methanol, it is a yellow solid which melts at 90°–100° C. Recrystallized from petroleum ether, it melts at 99°–101.5° C. 16.1 parts of this 2-iso-butenyl-4-(phenyl azo) phenol are heated in 150 parts of water containing 16 parts of caustic at 65° C. and 30 parts of sodium hydrosulfite are added slowly in small portions. When reduction is complete, the alkaline solution is cooled and is extracted with petroleum ether to remove aniline. Acidification of the alkaline solution with acetic acid yields white flakes of melting point 125°–126° C. A solution of 9.5 parts of this 2-iso-butenyl-4-amino phenol in 31.5 parts of glacial acetic acid containing 34 parts of 40% hydrobromic acid and a trace of zinc dust is refluxed for 3 hours, then is poured on ice, and is neutralized with an excess of 20% sodium hydroxide. The light brown precipitate is removed by filtration and is dried. Recrystallized from petroleum ether, the 2,2-dimethyl-5-amino coumaran melts at 68°–70° C.

EXAMPLE 5

*N-(2'-sulfo-4'-aminophenyl)-5-amino-2,2-dimethyl coumaran*

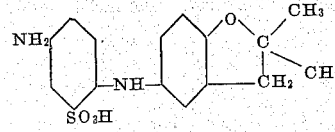

6.5 parts of 2,2-dimethyl-5-amino coumaran are condensed with 14.5 parts of 2-chloro-5-nitrobenzene sodium sulfonate (89.6%) in 100 parts of water containing 13 parts of calcium carbonate for 15 hours at reflux temperature. 100 parts of water, 1.6 parts of ammonium chloride and 10.7 parts of zinc dust are added to the reaction mixture which is refluxed for an additional 2 hours. After filtration, the filtrate is acidified with hydrochloric acid whereupon N-(2'-sulfo-4'-aminophenyl)-5-amino-2,2-dimethyl coumaran precipitates as a light grey solid. It is readily soluble in soda ash and is reprecipitated from this solution by acidification.

EXAMPLE 6

*N-(4'-aminophenyl)-5-amino-2,2-dimethyl coumaran hydrochloride*

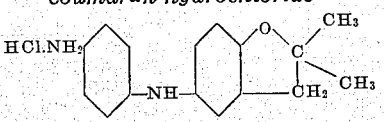

12 parts of N-(2'-sulfo-4'-aminophenyl)-5-amino-2,2-dimethyl coumaran are refluxed in 120 parts of 25% hydrochloric acid under an atmosphere of carbon dioxide. After 2 hours' heating, an additional 120 parts of 25% hydrochloric acid are added. After 20 hours, 59 parts of concentrated hydrochloric acid (1.19) are added and refluxing is continued for 3 hours. After cooling, the reaction mixture is treated with salt and the precipitated product filtered off. The residue is crystallized from dilute hydrochloric acid, yielding the hydrochloride salt of N-(4'-aminophenyl)-5-amino-2,2-dimethyl coumaran.

EXAMPLE 7

1 part of the hydrochloride salt of N-(4'-aminophenyl)-5-amino-2,2-dimethyl coumaran is dissolved in 25 parts of water together with 1.4 parts of hydrochloric acid (1.19), the solution is cooled with 5 parts of ice, and is diazotized by the addition of 0.24 part of sodium nitrite dissolved in 20 parts of water. 25 parts of the diazo solution so obtained are treated with 0.5 part of sodium acetate, 2 parts of 5% soda ash solution, 2.5 parts of water and 70 parts of a suitable carbohydrate thickener. Cotton piece goods previously impregnated in an alkaline solution of the anilide of 2-hydroxy-3-naphthoic acid are printed from an engraved roll with this color paste. The dried print is rinsed in a ½% soda ash solution at 140° F., is treated in a boiling 5% soda ash solution and is then soaped in a 0.1% soap solution at elevated temperature. A strong blue of bright shade is obtained.

EXAMPLE 8

When, instead of the anilide of 2-hydroxy-3-naphthoic acid, the alpha-naphthylamide is substituted a strong blue of somewhat greener shade results.

EXAMPLE 9

1.7 parts of N-(2'-sulfo-4'-aminophenyl)-5-amino-2,2-dimethyl coumaran as prepared in Example 5 are stirred in 50 parts of water containing 0.2 part of sodium hydroxide. To the clear solution is added 2.5 parts of hydrochloric acid (1.19). The resulting slurry is chilled to 5° C. and is diazotized by addition of a solution of 0.35 g. of sodium nitrite in 5 parts of water. A tan slurry of diazo results.

3.2 parts of di-(5,5'-hydroxy-7,7'-sulfo-2,2'-naphthyl) amine in 50 parts of water containing 3.2 parts of soda ash are chilled to 5° C. and the above diazo slurry is entered. Coupling is immediate with formation of a deep blue color. After 15 minutes, the temperature is raised to 80° C. and 20.0 g. of salt are added. The precipitate is filtered off, washed on the filter with 10% salt solution and the residue is dried at 45° C. The dark, blue-black powder is readily soluble in water, yielding a deep blue solution. It has the formula:

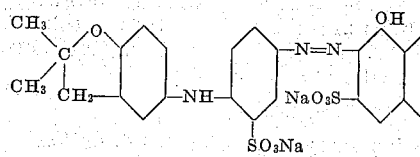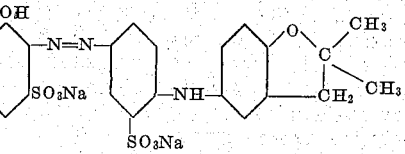

EXAMPLE 10

0.5 part of the dyestuff obtained in Example 9 is dissolved in 500 parts of water and one-tenth of this solution is diluted with 150 parts of water. 4.0 parts of salt are added and 5.0 parts of a previously wet-out cotton skein are entered to the dye bath. While turning the skein, the temperature is raised to and maintained at the boil for one-half hour. At this time, the skein is rinsed in hot water, is treated in a 1% soap solution at 65° C., is again rinsed and dried. A bright blue dyeing of high strength and brightness results.

EXAMPLE 11

One-tenth of the standard dye solution prepared in Example 10 is diluted with 200 parts of water and 2.0 parts of sodium sulfate and 2 parts of 5% sulfuric acid solution are added. 5.0 parts of a well boiled-out wool skein are entered and frequently turned as the temperature is raised to and maintained at the boil for one-half hour. At this time, the bath is exhausted. The skein is rinsed, treated in 1% soap solution at 65° C., rinsed and dried. It is evenly and strongly dyed a brilliant blue.

EXAMPLE 12

1.7 parts of N-(2'-sulfo-4'-aminophenyl)-5-amino-2,2-dimethyl coumaran are dissolved in 25 parts of water by the addition of 0.20 part sodium hydroxide. 2.5 parts of hydrochloric acid (1.19) are added to precipitate a fine slurry which is diazotized at 5° C. by the addition of 0.35 part of sodium nitrite dissolved in 5 parts of water. 1.4 parts of 1-(4'-sulfo-phenyl)-3-methyl pyrazolone-5 are stirred in 60 parts of water, dissolved by adding 3.2 parts of soda ash and the solution is stirred down to 5° C. The above diazo slurry is added whereupon an immediate deep red color forms. Coupling is complete within 15 minutes at which time the claret colored solution is heated to 70° C. and 40.0 parts of salt are added. When cool, the slurry is filtered and the residue is dried at 45° C. The product is a red-brown powder readily soluble in water, yielding a red solution. It has the formula:

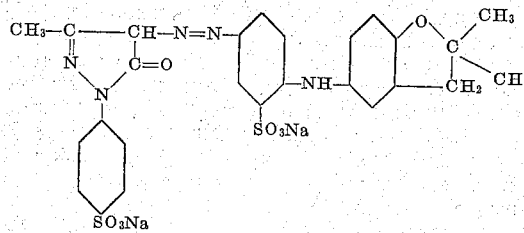

EXAMPLE 13

0.2 part of the dyestuff as obtained in Example 12 is dissolved in 200 parts of water and then 2.0 parts of sodium sulfate and 2 parts of 5% sulfuric acid are added. 5.0 parts of wool flannel which was previously well boiled out is entered to this dye bath and while agitating the cloth well the temperature is raised to and maintained at the boil for one-half hour. The cloth is then rinsed in fresh water, is treated at 65° C. in a 1% soap solution, is rinsed again and dried. The wool flannel is levelly dyed a deep red of good brightness.

We claim:

1. New azo dyestuffs of the general formula A—N=N—B in which A is the residue of a coupling component and B is the residue of a diazotized N-para-aminophenyl-5-amino coumaran having the type formula

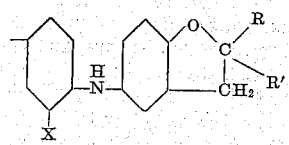

in which X is a member of the group consisting of hydrogen and sulfonic acid radicals and R and R' are selected from the group consisting of hydrogen and the lower alkyl radicals.

2. Azo dyestuffs according to claim 1 in which X is hydrogen.

3. Azo dyestuffs according to claim 1 in which X is hydrogen and A is the residue of an ice-color coupling component.

4. Azo dyestuffs according to claim 1 in which X is hydrogen and A is the residue of an arylide of 2-hydroxy-3-naphthoic acid.

5. An azo dyestuff having the formula:

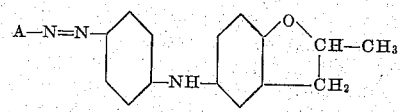

in which A is the residue of a coupling component.

6. An azo dyestuff having the formula:

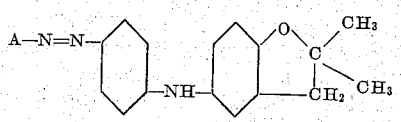

in which A is the residue of a coupling component.

HANS Z. LECHER.
ROBERT PRESCOTT PARKER.
ROBERT SIDNEY LONG.